May 27, 1930.   G. W. LIBBY   1,759,948

DEVICE FOR CONTROLLING THE ACTION OF VEHICLE SPRINGS

Filed Jan. 9, 1928

Inventor:
George W. Libby.
By
Henry L. Chenery.
ATTORNEY.

Patented May 27, 1930

1,759,948

UNITED STATES PATENT OFFICE

GEORGE W. LIBBY, OF PORTLAND, MAINE

DEVICE FOR CONTROLLING THE ACTION OF VEHICLE SPRINGS

Application filed January 9, 1928. Serial No. 245,351.

My invention relates in general to apparatus for controlling the rebound in motor-vehicle springs and concerns more particularly that type of device the characteristic feature of which is to act directly on the spring itself in contrast to those which employ some agent independently serving to hold the vehicle body against excessive upward movements.

The object of my invention is to provide an automobile accessory which will serve in a dual capacity,—first, to gently restrain and smooth out the short, rapid vibrations of the vehicle spring, and secondly, to supplement this, when the spring movement becomes abnormal, with a co-acting element which offers a resistance to upward movement of the spring of much greater potency.

Another object is to broaden the scope of the device by covering a greater range of spring action, involving the use of a relatively long leaf having, preferably, a thicker end portion fulcrumed on the spring adjacent the stiffer section thereof and a thinner portion somewhat more resilient engaging the spring at a point near which the greatest bending action of the latter takes place.

I have illustrated my invention by the use of the accompanying drawings in which is disclosed one embodiment thereof which, at the present time, I consider preferable to other possible forms of the invention, and in which,—

Similar reference characters indicate like parts in all views.

Figure 1:
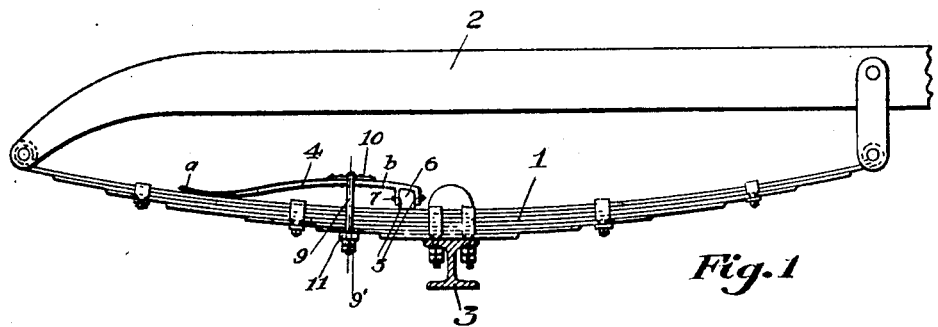
Fig. 1 is a side elevation of the device shown mounted on a motor-vehicle spring.
Figure 2:
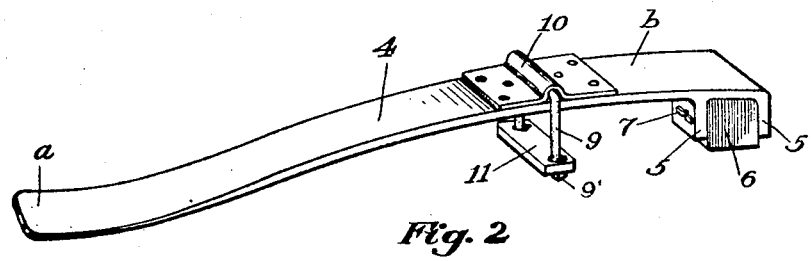
Fig. 2 is a perspective of the device.
Figure 3:
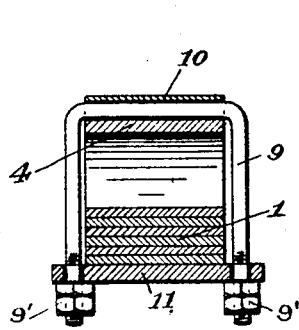
Fig. 3 is a transverse section taken on line 3—3, Fig. 1.

Referring to the drawings, 1 is the spring of a motor-vehicle, 2 the frame and 3 the axle thereof.

4 is the leaf of my spring control which I make of substantially the same width as the spring itself. I preferably make the forward end, $a$ of this leaf considerably thinner than the rearward end $b$ so as to obtain greater flexibility, but this manner of constructing it is not absolutely essential. At the end $b$ are channels 5, 5, within which I secure a resilient element, preferably rubber, by means of the cotter-pin 7.

Figures 4, 5:
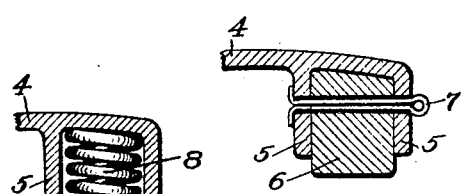
Fig. 4 is a longitudinal section through the rear end.
Fig. 5 is a modification of the above.

I may elect to supply this resilient member in the form of a helical spring 8, see Fig. 5, but so far as the action of the device is concerned it is immaterial, as either element obtains practically the same result.

At a point considerably nearer the rearward than the forward end of the leaf 4 I provide means to secure the U bolt 9, using for this purpose the plate 10 which is riveted to the leaf. A cleat 11, through which the ends of the U bolt pass bears firmly on the under side of the vehicle spring and by means of the nuts 9' a greater or lesser tension of the cleat against the spring may be had.

In Fig. 1 I have shown how and where I mount the device on the vehicle spring in most cases, although the position, lengthwise of the spring, may be varied to suit circumstances,—it oftentimes being desirable to secure the leaf nearer the end of the spring and in some cases rearwardly of the axle, instead of forwardly thereof.

To facilitate its longitudinal movement on the spring during violent action of the latter, I bend the end $a$ upward, slightly. In any event, the rearward end $b$ of the leaf is always nearer the axle and resting on a thicker and less resilient portion of the spring than does the other end $a$. Should the leaf be made of a uniform thickness throughout it might be desirable to make the resilient member 6 stiffer, or less flexible.

The end $a$ of the leaf is carried forward to a location on the spring where the greatest bending action thereof takes place, and it is, obviously, here that the resistant pressure acting against this bending movement should be applied.

In operation, the slight body movements of the vehicle, as when travelling over uneven pavements, are taken up to a large extent by the compression of the member 6 which, while bringing a slight tension on the vehicle spring at the forward end of the leaf, does not materially effect or destroy the natural resiliency of the spring,—simply makes it steadier.

But when the vehicle passes over very uneven stretches of road-bed, causing the body to bound violently, then the rearward end 5 abuts solidly on the thicker portion of the spring,—the member 6 being compressed within the channel,—and the forward end $a$ of the leaf stiffens as it is bent upwardly by the rebound of the vehicle spring and gradually halts the excessive "up" movement thereof.

It will be apparent, from observing Fig. 1, that as the frame rises, bending the spring 1 upwardly, there is a slight relief of the strain on the leaf 4, due to the fact that the U bolt 9 and cleat 11 also rise slightly with the spring, although being located nearer the thicker and more rigid portion of the latter this upward movement of these members, 9 and 11, is very slight compared with that of the resilient end of the leaf 4 at the point of its contact with the spring 1.

Furthermore, it will be noted that the parts composing the device have three points of contact with the spring and effects, principally through the agency of the member 6, a binding of the leaves together for the purpose of increasing the friction therebetween.

But the application of this frictional control is made principally to cover the small vibrations and moderately large bounds of the spring and the softening of the extreme movements is largely the function of the resilient end of the leaf 4,—acting as a yielding stop and not as a friction-producing element solely.

Observing Fig. 1 and assuming that the vehicle is in a heavy rebound, sufficiently strong to bend the leaves of the spring so that the member 6 has been forced into its holding member, and the parts 5, 5 are firmly contacting on the rigid portion of the vehicle spring, then it will be apparent that the leaf 4 is, to all intents and purposes, rigidly fixed on the heavy and practically inflexible portion of the spring; and as I preferably make the portion of the leaf, $b$, shorter than the portion $a$,—measured in each case from the U bolt,—the latter portion will be much more flexible, and being free to move will act as a yielding stop element to retard the upward movement of the top leaf of the spring in addition to its function to act as one element in the friction-producing combination.

During the downward movement, or straightening of the leaves of the spring 1, the resilient member 6 expands sufficiently to hold the parts against displacement from the spring.

The device is simple in construction, very low in cost, its installation on a vehicle spring very easily accomplished,—requiring no holes to be drilled and but two nuts to be adjusted,—and in practical demonstrations has proven very efficient and satisfactory.

What I claim and wish to secure by Letters Patent is:—

1. In a device of the character described, adapted to be applied to a vehicle spring, comprising in combination with said spring, a bent resilient leaf thicker on one end than on the other and having at the thicker end a socket, a member, of relatively greater resiliency than leaf, seated in said socket, a U bolt adapted to secure said leaf on said vehicle spring—the socket end of said leaf being located adjacent the thicker portion of said vehicle spring, and means to vary, either to increase or decrease, the tensional pressure of said leaf on said spring.

2. In a device of the character described comprising in combination with a vehicle spring, a curved, resilient leaf having thick and thin ends, respectively, a socket in the thick end of said leaf, an elastic rubber member secured in said socket and projecting outwardly thereof a spaced distance, a U bolt securing said leaf to said spring—the thinner end of said leaf and said elastic rubber member contacting with said spring during minor bending movements of said spring but upon major movements thereof said leaf adapted to directly abut, at both ends, on said spring, and means on said U bolt whereby greater or lesser yielding pressure of said leaf on said spring may be exerted.

In testimony whereof I affix my signature.

GEORGE W. LIBBY.